Aug. 5, 1947.  J. B. REEVES  2,425,047

FREQUENCY RESPONSIVE CONTROL SYSTEM

Filed Nov. 20, 1944

Inventor
James B. Reeves.
By [signature]
Attorney

Patented Aug. 5, 1947

2,425,047

UNITED STATES PATENT OFFICE 2,425,047

FREQUENCY RESPONSIVE CONTROL SYSTEM

James B. Reeves, Whitefish Bay, Wis., assignor to Cutler-Hammer, Inc., Milwaukee, Wis., a corporation of Delaware Application November 20, 1944, Serial No. 564,356

9 Claims. (Cl. 172—289)

The invention relates to a control system which is responsive to a current of variable frequency and while not limited thereto is particularly applicable for controlling the starting and operation of synchronous motors.

In starting synchronous motors it is desirable to supply energy from an alternating current source to the armature of the motor, while the field winding is short circuited upon itself. When the motor has reached nearly synchronous speed, the short circuit is removed from the field winding and the latter is connected to a supply of direct current, whereupon the motor pulls into step. It is also desirable to arrange for disconnection of the direct current supply and for short circuiting of the field winding upon the motor pulling out of step due to an overload or any other cause, so that it may be synchronized again in the usual manner without interrupting the supply of alternating current to the armature.

The present invention has for one of its objects to provide a system for synchronizing synchronous motors.

Another object is to provide in a synchronous motor starter means for controlling the direct current excitation of the field winding of the motor.

Another object is to provide means affording a control voltage which is a function of a variable frequency.

Another object is to provide means for charging a condenser at a given rate and discharging it during the operation of the charging means at intervals varying in frequency.

Another object is to provide means responsive to a voltage which varies as a function of the ratio of two frequencies.

Other objects and advantages will hereinafter appear.

The accompanying drawing illustrates an embodiment of the invention.

In the drawing,

Figure 1 is a diagram of a system embodying the invention, while

Figure 1:
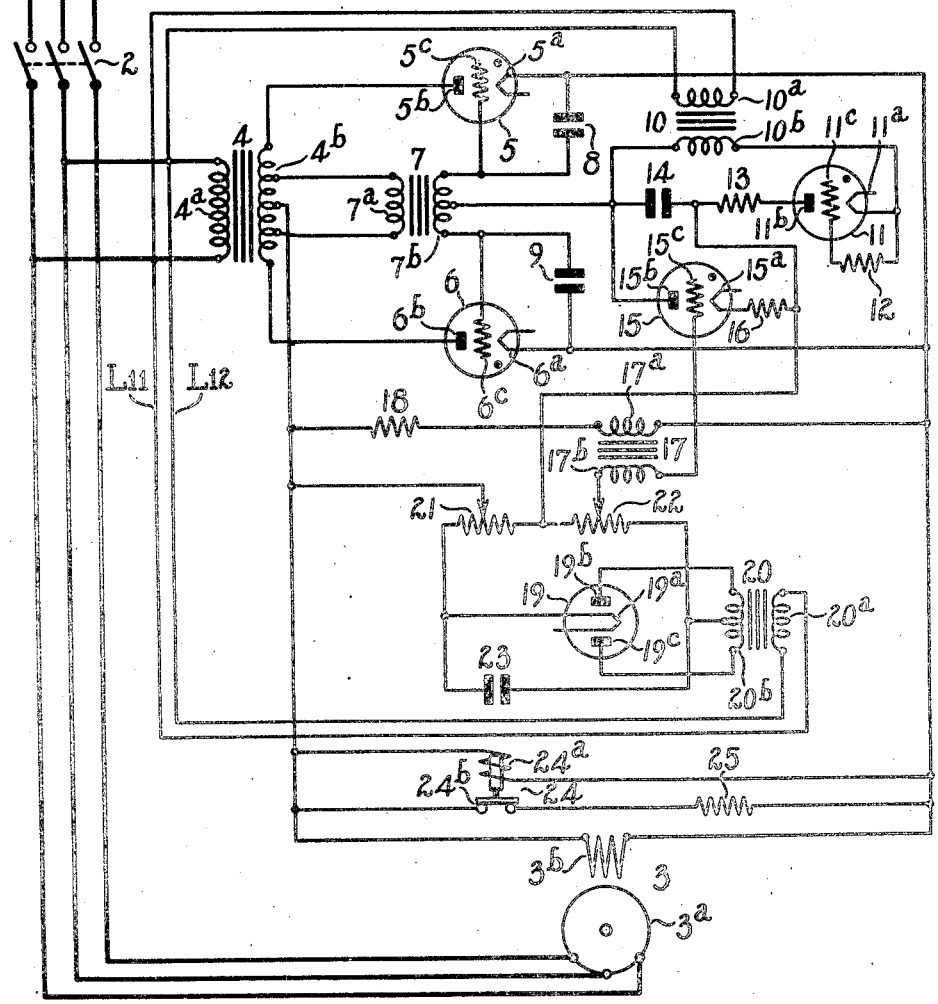

As is well understood, a synchronous motor is usually started by connecting the armature to an alternating current source of energy, whereupon the motor starts up as an induction motor. When the motor armature has reached a speed near synchronism, the field winding is supplied with direct current energy which causes the motor to pull into step and run as a synchronous motor. In order not to cause too great a disturbance in the alternating current power supply, it is essential that the field winding energizing current be initially supplied at a moment at which the field poles bear a certain space relation to the rotating alternating magnetic field induced by the alternating current. The present system assures such power relation and further assures that if the motor after being synchronized should be pulled out of step due to overload or other causes, the direct current excitation is reduced and is again brought up to its normal value and the motor is re-synchronized when the disturbance has disappeared.

Referring to the drawing, the same illustrates bus bars L1, L2, and L3, which supply three-phase alternating current energy through a manually operated switch 2 to the primary winding 3ª of a synchronous motor 3. The motor is also provided with a field winding 3ᵇ.

When the switch 2 is closed, it also energizes the auxiliary bus bars L11 and L12 to the potential of the bus bars L1 and L2, respectively, to supply a single phase voltage to the primary winding 4ª of a transformer 4, which is also provided with a center tapped secondary winding 4ᵇ. The transformer winding 4ᵇ supplies alternating current which is rectified to energize the winding 3ᵇ. Connected to the end terminals of the winding 4ᵇ are the anodes 5ᵇ and 6ᵇ, respectively, of gaseous electron tubes 5 and 6. These tubes are also provided with cathodes 5ª and 6ª, respectively, and control electrodes 5ᶜ and 6ᶜ, respectively. The cathodes 5ª and 6ª are jointly connected to one terminal of the winding 3ᵇ, the other terminal of the said winding being connected to the center tap of the winding 4ᵇ. The control electrode 5ᶜ is connected to one end terminal and the control electrode 6ᶜ to the other end terminal of a center tapped secondary winding 7ᵇ of a transformer 7, the primary winding 7ª of which is connected to taps intermediate of the center tap and the end taps of the winding 4ᵇ. A smoothing condenser 8 is connected across the electrodes 5ª and 5ᶜ, and a similar condenser 9 across the electrodes 6ª and 6ᶜ.

An alternating biasing potential is impressed upon the center tap of the winding 7ᵇ by the secondary winding 10ᵇ of a transformer 10, the primary winding 10ª of which is connected to the bus bars L11 and L12. One end terminal of the winding 10ᵇ is connected to the center tap of winding 7ᵇ, while the other terminal is connected to the cathode 11ª of a gaseous electron tube 11, which is also provided with an anode 11ᵇ and a control electrode 11ᶜ. Connected between the cathode 11a and the control electrode 11c is a resistor 12. The anode 11b is connected through a resistor 13 to one terminal of a condenser 14, the other terminal of which is connected to the center tap of winding 7b. The condenser 14 is shunted by a parallel circuit comprising a gaseous electron tube 15, which is provided with a cathode 15a, an anode 15b, and a control electrode 15c, and a resistor 16 connected in series with the tube 15 between the cathode 15a and the common terminal of the condenser 14 and resistor 13. The control electrode 15c is connected to one terminal of the secondary winding 17b of a transformer 17, the primary winding of which is connected in series with a resistor 18 across the terminals of the winding 3b.

The system further provides for an adjustable direct current bias potential for the control electrodes 5c and 6c. This direct current potential is obtained from a transformer 20, the primary winding 20a of which is connected across the bus bars Ll1 and Ll2, while the end terminals of its center tapped secondary winding 20b are connected to the anodes 19b and 19c, respectively, of a full wave rectifying tube 19, which is also provided with a cathode 19a. The cathode 19a is connected to the center tap of the winding 20b, through a pair of series connected adjustable voltage dividers 21 and 22 and through a condenser 23, which is connected in parallel with said voltage dividers. The center tap of the winding 4b is connected to the adjustable contact of the divider 21, while the second terminal of the winding 17b is connected to the adjustable contact of the divider 22. The common terminal of the resistors 21 and 22 is connected to the common terminal of the condenser 14 and the resistors 13 and 16.

The system may further be provided with an electromagnetic relay 24, having an energizing winding 24a, and normally closed contacts 24b. The contacts 24b normally connect a resistor 25 across the terminals of the winding 3b, as will be explained hereinafter.

The system thus far described operates as follows: A voltage is impressed between the control electrodes of the tubes 5 and 6, and their corresponding anodes. The principal component of such voltage is the voltage induced in the secondary winding 7b of transformer 7. The transformer 7 is so connected to the secondary winding 4b of the transformer 4 that, during the respective positive half-cycles of the tubes 5 and 6, the potential impressed upon their respective control electrodes is negative, so as to prevent conduction of current through the tubes. As a result no current is supplied to the winding 3b of the motor. However, an additional unidirectional potential is superposed upon the aforementioned alternating component, tending to make the control electrodes of the tubes 5 and 6 positive with respect to their respective cathodes. This potential is supplied by the condenser 14. The condenser 14 is supplied with half-wave rectified current through a circuit from the secondary winding 10b, through the condenser 14, resistor 13, and the tube 11. The unidirectional bias supplied by the condenser 14 varies with the charge of the condenser 14. At the moment of closure of the switch 2, the condenser of course has no charge and therefore no direct current bias from that source is available.

A second direct current bias is supplied by the resistor 21. It will be noted that as soon as the switch 2 is closed, the rectifier 19 causes a direct current to flow through the voltage dividers 21 and 22, and a portion of the voltage drop of the voltage divider 21 is impressed between the anodes of the tubes 5 and 6, through the connection of the movable contact of said voltage divider as has been explained. Normally the adjustment of the resistor 21 is such that the direct current bias produced thereby is insufficient to overcome the negative bias derived from the transformer winding 7b, so that upon closure of the switch 2 no exciting current is permitted to flow from the transformer 4 through the tubes 5 and 6, respectively, to the winding 3b.

The condenser 14 receives a charge during each alternate half-cycle, that is, when the tube 11 is conducting. The successive charges add to raise the potential of the condenser. However, a voltage is induced in the transformer 17, which at the moment of closure of the switch 2 impresses upon the grid 15c, a positive potential which causes the tube 15 to become conducting, thereby discharging the condenser and keeping it discharged as long as tube 15 is conducting. Thereafter the tube 11 can resume again the charging as described.

As the motor 3 accelerates, the frequency of the current induced in the winding 3b decreases. This obviously decreases the frequency of the periods during which the tube 15 becomes conducting to discharge the condenser 14, while consequently the duration of the intervals during which the condenser 14 is charged increases. Thus the intervals between the discharge periods are gradually lengthened, so that the total charge acquired by the condenser 14 during such intervals increases. It follows that by suitable proportioning of the constants of the charging and discharge circuits of the condenser 14, the latter attains between discharges a maximum potential which increases with the decrease of the slip frequency of the voltage induced in the winding 3b. Ultimately the maximum charge of the condenser 14 which adds to the direct current bias of the resistor 21 is such as to overcome the negative bias derived from the transformer 7, so that at the respective half-cycle the tubes 5 and 6 become conducting and a unidirectional energizing current is impressed upon the field winding 3b which will cause the motor 3 to synchronize.

Figure 2:
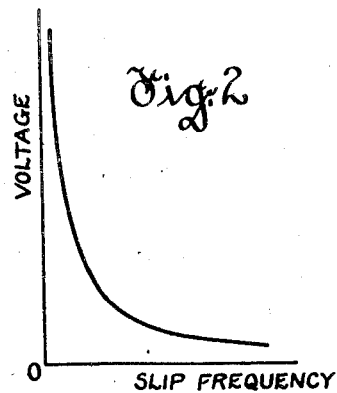
Fig. 2 shows the relation of certain control variables of the system.

As has been pointed out the slip frequency at which the voltage of the condenser 14 is of sufficient magnitude to give a positive bias to the control electrodes 5c and 6c, depends upon the adjustment of the resistor 21 which furnishes the supplemental unidirectional bias. The voltage of the condenser as a function of the slip frequency is illustrated in Fig. 2. From this it will be seen that it increases very rapidly with decreasing slip at low slip frequency, so that a very precise response of the apparatus near synchronism is obtained.

The relay 24 has a relatively high inductance so that the flux induced in its magnetic circuit at high frequency is relatively low and that it does not attract its armature to open its contacts 24b until the frequency of the alternating current is relatively low. The relay assures that the field winding 3b is closed by a discharge circuit through the contacts 24b and the resistor 25, until the slip frequency has decreased to a sufficiently low value, so that the winding 3b acts during starting as a secondary winding in a well known manner.

It will be apparent that the biasing voltage supplied through the voltage divider 21 may be supplied by any other source, such as, for instance, a battery. The same is true of the biasing voltage supplied to the control electrode 15c by the voltage divider 22.

The condensers 8 and 9 are for the purpose of absorbing transients in the grid voltage of the respective tubes. In the same manner the condenser 23 smoothes out the ripples of the rectified unidirectional current supplied by the transformer 20 to the rectifier 19.

If the synchronous motor should fall out of step due to an overload or some other cause, the direct current excitation of the motor will be stopped due to the decrease of the potential of the condenser 14 and the resulting stoppage of the conduction of the tubes 5 and 6, and as the cause of the disturbance is removed, the motor will again accelerate and will be synchronized in the manner aforedescribed.

While in the foregoing the invention is shown as incorporated in a system for controlling the excitation of a synchronous motor it is to be understood that it may also be employed to control the operation of translating devices in response to a variable frequency or in response to the variation of the ratio between two frequencies.

I claim:

1. In a synchronous motor starter, the combination with a synchronous motor having an alternating current armature and a direct current field winding, a source of unidirectional current and means to supply alternating current to said armature to accelerate said motor and operate it at synchronous speed, of a condenser, means for supplying energy to said condenser at a given rate for a given frequency of the alternating current supply to charge said condenser, means responsive to the frequency of the voltage induced in said field winding by the alternating current in said armature to periodically discharge said condenser, and means responsive to a given potential of said condenser to connect said source of unidirectional current to said field winding, thereby to render response of said last named means dependent upon the frequency of said induced voltage.

2. In a synchronous motor starter, the combination with a synchronous motor having an alternating current armature and a direct current field winding, a source of unidirectional current and means to supply alternating current to said armature to accelerate said motor and operate it at synchronous speed, of a condenser, means periodically tending to charge said condenser to a given potential at the frequency of said alternating current source, means responsive to the frequency of the voltage induced in said field winding by the alternating current in said armature to periodically discharge said condenser, and means responsive to a given potential of said condenser to connect said source of unidirectional current to said field winding, thereby to render response of said last named means dependent upon the ratio of said two frequencies.

3. In a synchronous motor starter, the combination with a synchronous motor having an alternating current armature, and a direct current field winding, an alternating current source and means to connect said source to said armature to accelerate said motor and operate it at synchronous speed, of a condenser, means periodically tending to charge said condenser to a given potential at the frequency of said alternating current source, means responsive to the frequency of the voltage induced in said field winding by the alternating current in said armature to periodically discharge said condenser, and rectifying means connected between said alternating current source and said field winding and responsive to a given potential of said condenser to supply a unidirectional energizing current to said field winding, thereby to render response of said last named means dependent upon the ratio of said two frequencies.

4. In a synchronous motor starter, the combination with a synchronous motor having an alternating current armature and a direct current field winding, an alternating current source and means to connect said source to said armature winding to accelerate said motor and operate it at synchronous speed, of a condenser, electronic means for supplying rectified current from said source to said condenser at a given rate for a given frequency of said alternating current source to charge said condenser, electronic means responsive to the frequency of the voltage induced in said field winding by the alternating current in said armature to periodically discharge said condenser, and electronic rectifying means connected between said source and said field winding and responsive to a given potential of said condenser to supply unidirectional energizing current to said field winding, thereby to render response of said last named means dependent upon the ratio of said two frequencies.

5. In a frequency responsive system, a condenser, means responsive to a given potential of said condenser, means for periodically tending to charge said condenser to a given potential, and means affording periodic discharge of said condenser, the periodicity of said discharge decreasing as a function of a decreasing frequency of the system, thereby to render response of said first mentioned means dependent upon said frequency.

6. In a system involving a frequency which may vary and a varying frequency functionally related to the first frequency, a condenser, means responsive to a given potential of said condenser, means tending to charge said condenser to a given potential in a period varying with the first frequency, and means affording periodic discharge of said condenser, the periodicity of said discharge varying as a function of the second frequency, thereby to render response of said first mentioned means dependent upon the ratio of said two frequencies.

7. In a system involving a frequency which may vary and a varying frequency functionally related to the first frequency, a condenser, means responsive to a given potential of said condenser, means for supplying to said condenser a number of substantially equal quantities of energy succeeding each other at a rate varying as a function of the first of said frequencies to charge said condenser, and means affording periodic discharge of said condenser, the periodicity of said discharge varying as a function of the second of said frequencies, thereby to render response of said first mentioned means dependent upon the ratio of said two frequencies.

8. In a system for supplying energy to a translating circuit from an electric energy source, the combination of means to connect said translating circuit to said source, a condenser, means for supplying energy to said condenser at a given rate to charge the same, means to supply a voltage of variable frequency and responsive to afford periodic discharge of said condenser during alternate half-cycles of said voltage, and means responsive to a given potential of said condenser to connect said translating circuit to said source, thereby to render response of said last named means dependent upon said frequency.

9. In a system for supplying energy to a translating circuit from an electric energy source, the combination of means to connect said translating circuit to said source, a condenser, means responsive to a variable frequency and tending to charge said condenser to a given potential in a period varying with said frequency, means responsive to a periodically varying voltage of varying frequency to afford discharge of said condenser during alternate half-cycles of said voltage, and means responsive to a given potential of said condenser to connect said translating circuit to said energy source, thereby to render response of said last named means dependent upon the ratio of said two frequencies.

JAMES B. REEVES.

REFERENCES CITED

The following references are of record in the file of this patent:

UNITED STATES PATENTS

| Number | Name | Date |
|---|---|---|
| 2,019,769 | Poole | Nov. 5, 1935 |
| 2,110,015 | Fitzgerald | Mar. 1, 1938 |
| 2,176,742 | La Pierre | Oct. 17, 1939 |
| 1,983,656 | Brown | Dec. 11, 1934 |
| 2,102,371 | Miller | Dec. 14, 1937 |